United States Patent [19]

Hunt

[11] Patent Number: 4,848,828
[45] Date of Patent: Jul. 18, 1989

[54] EXPANDABLE COVER FOR AN OPEN ENCLOSURE

[75] Inventor: John F. Hunt, Arlington, Wash.
[73] Assignee: Hunt-Davis, Inc., Seattle, Wash.
[21] Appl. No.: 26,765
[22] Filed: Mar. 24, 1987
[51] Int. Cl.$^4$ .............................................. B60P 7/04
[52] U.S. Cl. .................................... 296/100; 150/154
[58] Field of Search .................. 296/100, 98; 52/3; 150/52 R

[56] References Cited

U.S. PATENT DOCUMENTS

| | | | |
|---|---|---|---|
| 3,614,154 | 10/1971 | Evans | 296/100 |
| 4,014,590 | 3/1977 | Schutz, Jr. | 296/100 |
| 4,126,351 | 11/1978 | Peteretti | 296/100 |
| 4,341,416 | 7/1982 | Richard | 296/100 |

*Primary Examiner*—Robert R. Song
*Attorney, Agent, or Firm*—Seed and Berry

[57] ABSTRACT

A cover for an open enclosure, such as the open rear cargo bed of a truck. The cover is expandable so as to permit the enclosing of materials which extend above the upper edges of the cargo bed sidewalls. This is accomplished by providing a one piece cover which is foldable along two edges to form left and right main panels as well as an intermediate portion which extends below and between the left and right main panels. In an exemplary embodiment, the main panels are held in a closely spaced apart relationship by means of resiliently expandable straps attached to the left and right main panels. When the cover is placed over material which extends above the cargo bed sidewalls, the left and right main panels are pulled apart exposing greater portions of the surplus material forming the intermediate portion of the cover.

2 Claims, 4 Drawing Sheets

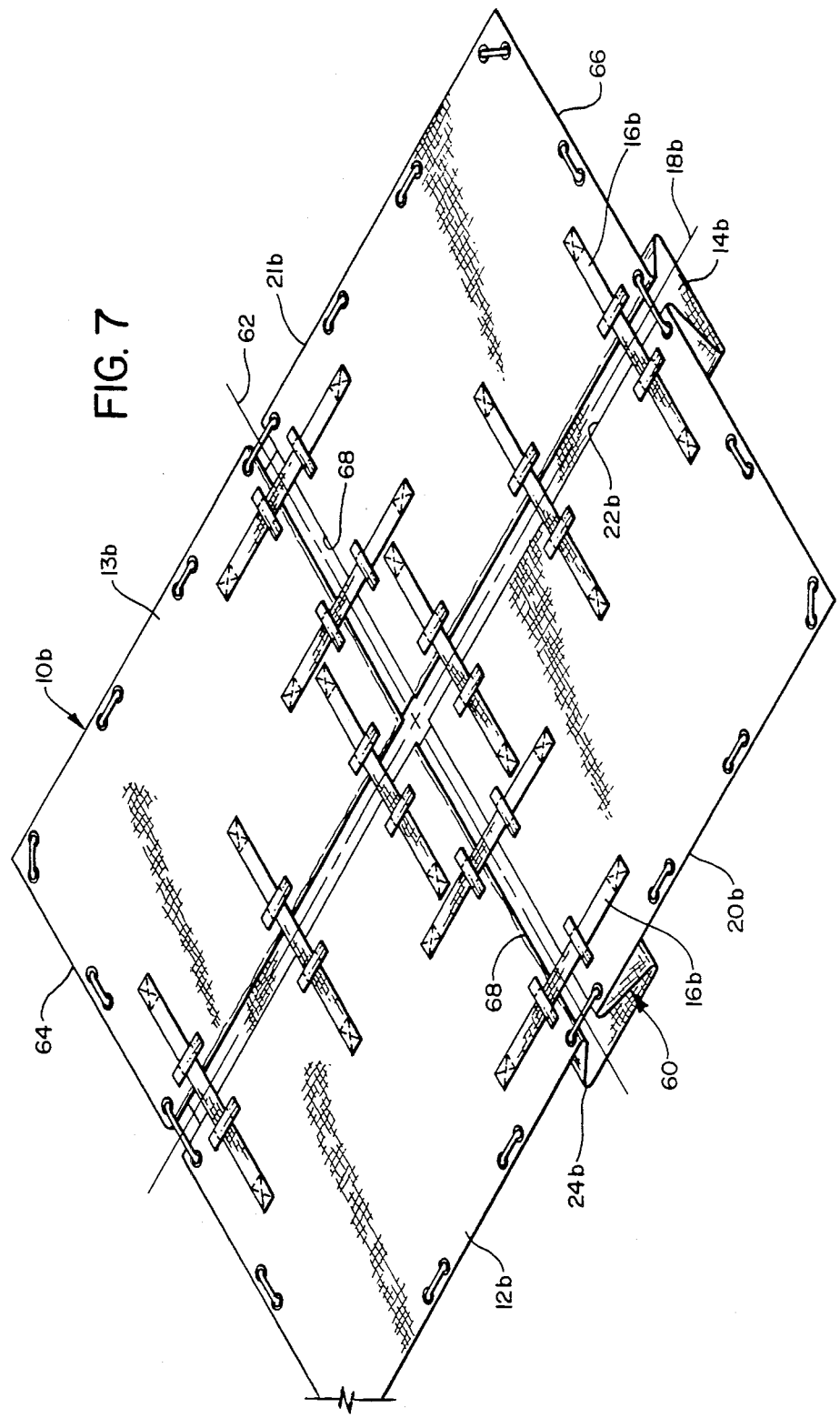

EXPANDABLE COVER FOR AN OPEN ENCLOSURE

TECHNICAL FIELD

The present invention relates to a cover which is installed across an open top of an enclosure, such as the rear cargo bed of a truck, and which is expandable so as to enclose material which extends above the top of the cargo bed.

BACKGROUND OF THE INVENTION

It has been common practice to utilize a cover when hauling materials in the rear cargo bed of a truck. Not only does the cover protect the materials from the weather, but it also prevents these materials from being accidentally dislodged from the bed.

Accidental discharge from the cargo bed is particularly prevalent when hauling lightweight materials such as papers and leaves. A number of states have determined that a significant amount of trash found along the highways is due to improper securing of waste material in open cargo beds. In response to this, some states have enacted laws which require a cover over any materials hauled in an open cargo bed.

Many of these covers share a common feature; that is, when they are attached to the vehicle they stretch tautly in a horizontal manner across the top of the cargo bed between the cargo bed sidewalls. This provides a symmetrical appearance to the cargo bed, however it limits the amount of material that can be hauled at any one time. More particularly, these covers are unsuitable for covering materials which extend above the upper edges of the cargo bed sidewalls.

For example, in U.S. Pat. No. 4,607,876 by Reed, there is set forth a cargo bed cover which is movable from a lower position across the top edges of the cargo bed sidewalls, to an erect position above the cargo bed so as to function as a tent. Another device which acts as a truck bed cover, as well as a tent, is disclosed in U.S. Pat. No. 3,367,347 by Smith.

A cargo bed cover which is foldable in an accordian-like manner to provide access to the cargo bed is disclosed in U.S. Pat. No. 4,547,014 by Wicker. Other rear cargo bed covers which are supported on a foldable frame are disclosed in U.S. Pat. No. 3,820,840 by Forsberg, as well as U.S. Pat. No. 4,265,479 by Langston.

In U.S. Pat. No. 3,614,154 by Evans, there is disclosed a flexible cover for an open topped trailer body; the cover being attached to the trailer by means of tie down cords which are secured about cleats on the vehicle.

Helms, in U.S. Pat. No. 1,856,280, discloses a cover for the dump body of a refuse vehicle; the cover including a frame which is pivotally connected to the vehicle to permit the cover to be collapsed for access to the dump body.

Furthermore, in U.S. Pat. No. 3,051,524 by Palmer there is disclosed an edge shield for a tarpaulin cover which serves to protect the tarpaulin cover when it is stretched over the corners of the cargo bed.

SUMMARY OF THE INVENTION

The present invention pertains to an expandable cover assembly which is attached across the upper sidewalls of an open cargo bed. The cover assembly includes a cover panel formed by first and second panel portions, as well as an intermediate portion which is located between the first and second panel portions. The first and second panel portions are each folded along an inner lengthwise edge to form the intermediate portion therebetween. The first and second panel portions are connected by expandable straps which have a first unexpanded mode in which the inner edges of the first and second panel portions are closely separated. In the unexpanded mode, the first and second panel portions extend across the top of the cargo bed, while the material forming the intermediate portion is gathered as a surplus below the first and second panel portions. In a second expanded mode when accommodating cargo which extends above the upper edges of the cargo sidewalls, the first and second panel portions are caused to separate against the bias of the expandable straps thereby spreading the intermediate portion of the cover.

In this manner, the cover is stretched smoothly across the truck cargo bed in a horizontal manner to provide a pleasing appearance when the cargo materials do not extend above the cargo bed sidewalls. However, should the cargo materials extend above the cargo bed sidewalls, the cover is expandable by means of the straps and the intermediate cover portion to accommodate these upstanding materials.

It is an object of the present invention to provide a cover for an open enclosure, such as the open cargo bed of a truck; the cover being expandable to accommodate larger cargo materials contained in the cargo bed.

BRIEF DESCRIPTION OF THE DRAWINGS

These and other objects and advantages of the present invention will become more readily apparent upon reference to the following Detailed Description and attached Drawings, in which:

FIG. 7 is an isometric view of another exemplary embodiment of the cover in which the cover includes intermediate expandable portions extending in both lengthwise and transverse directions.

Figure 1:
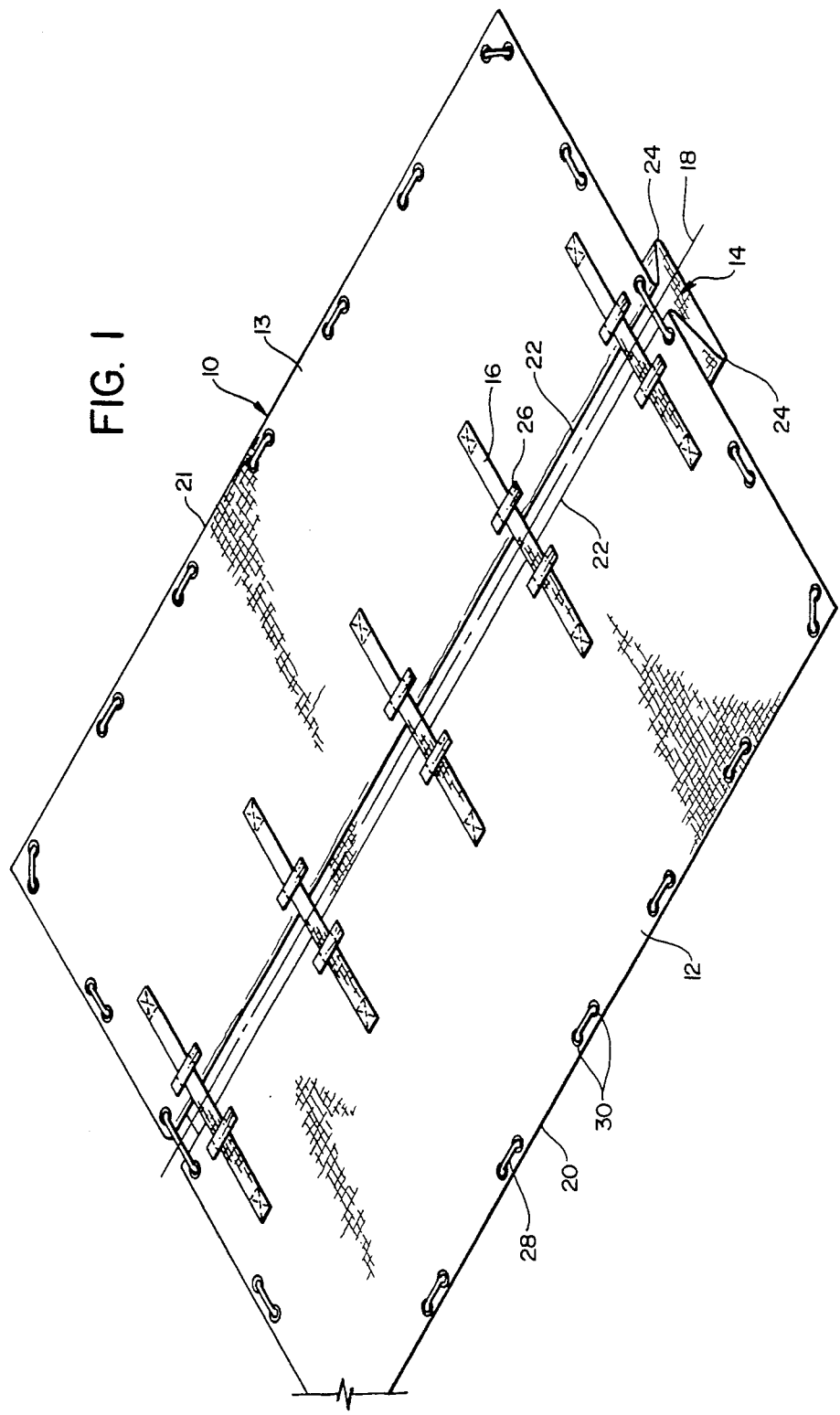
FIG. 1 is an isometric elevational view of the cover of the present invention.

While the present invention is susceptible of various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION

The present invention pertains to a cover for an open topped enclosure. The cover is expandable to permit enclosing materials which extend above the enclosure's upper edges. In an exemplary embodiment, the cover will be described as covering the open rear cargo bed of a truck; however, the scope of the present invention has broader application than that described in the exemplary embodiment.

Figure 2:
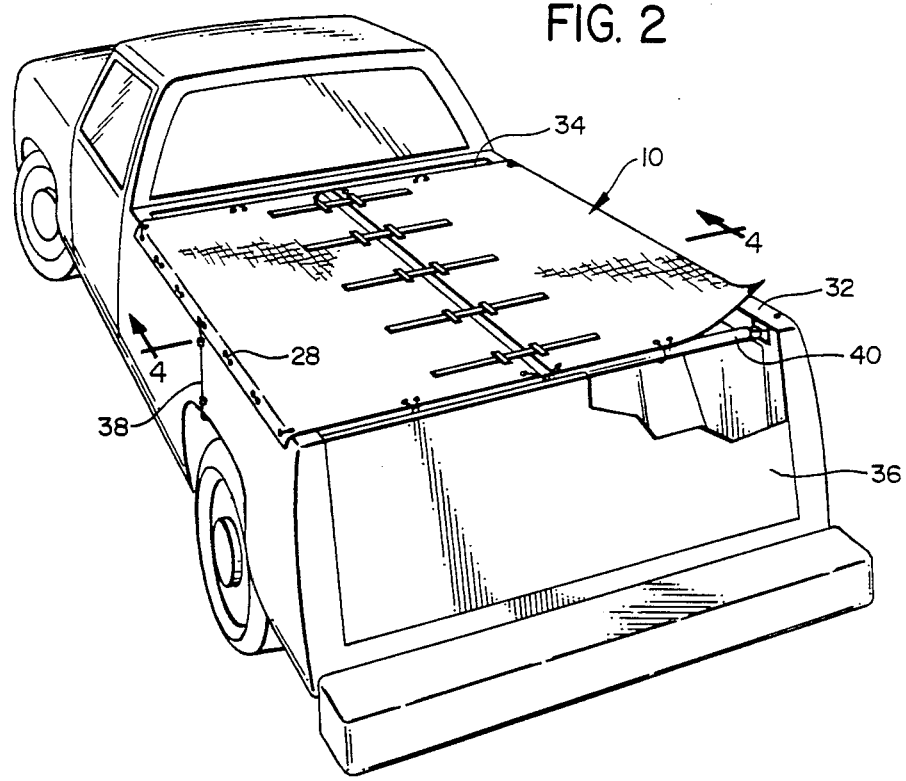
FIG. 2 is an isometric view of the cover which is utilized in an exemplary embodiment to cover the open rear cargo bed of a pickup truck.
Figure 5:
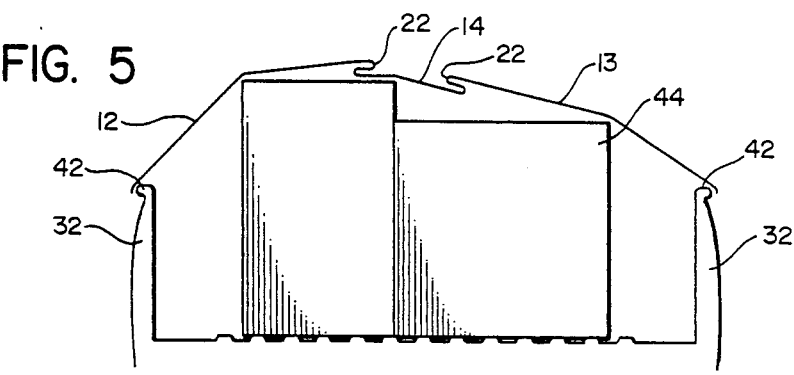
FIG. 5 is an end view similar to FIG. 4 showing a cargo bed containing material which extends above the upper edges of the cargo bed sidewalls and which is enclosed by the cover of the present invention.

Referring now to FIG. 1, there is shown a one-piece cover indicated at 10 including left, right main panel portions 12, 13, respectively, and an intermediate panel portion indicated at 14, which is folded as surplus material below the main panels 12 in the form of a pair of oppositely extending pleats. The left and right main panels 12 are held in proximity to each other by a number of transversely extending resilient straps 16. In this manner, when the cover 10 is secured to an empty or partially filled cargo bed of a truck as shown in FIG. 2, the cover extends horizontally across the cargo bed to provide a pleasing symmetrical appearance. However, in the event materials contained in the cargo bed extend upwardly above the upper edges of the cargo bed, as shown in FIG. 5, the straps permit the main panels to separate apart, spreading the surplus material of the intermediate panel 14, and thus providing a cover over these upstanding materials.

Having provided a brief overview of the present invention, a more detailed description will be provided hereinafter. Referring again to FIG. 1, the cover 10 is made of a flexible material such as sailcloth, and more preferably, the material is made of a nylon known by the brandname "Rhino-Tex". To provide an expandable cover, the cover 10 is folded twice along its lengthwise axis, indicated by the line 18, at locations intermediate to the left, right edges 20, 21 of the cover 20; preferably these folds occur at opposite sides of the lengthwise centerline of the cover.

More particularly, in the exemplary embodiment shown in FIG. 1, the cover is folded along two lengthwise edges 22 so that a portion of the left panel 12 extends downwardly and outwardly toward the left edge 20, and a portion of the right panel 12 extends downwardly and outwardly toward the right edge 21. A pair of second lengthwise folds are made along lines 24 so that the intermediate portion of the cover reverses direction and extends inwardly in a horizontal manner where the left portion 12 meets the right portion 13 of the cover. To maintain the folded configuration of the intermediate portion, the intermediate portion 14 may be formed of a material having "memory" for returning to the folded configuration.

The precise folded configuration of the intermediate portion 14 is not important. It is important, however, that the transverse dimension of the material forming the intermediate portion be greater than the transverse distance between edges 22. In other words, to permit expansion of the cover, it is important there be a surplus of material forming intermediate portion 14 when the cover is in the unexpanded mode shown in FIG. 1.

To retain the fold edges 22 in a close, spaced apart relationship, the resilient expandable straps 16 are attached at their opposite ends to the left and right panels 12, 13, respectively, in a manner generally perpendicular to the lengthwise axis 18. Each strap is further secured to the upper surface of the cover by means of a pair of lengthwise extending tabs 26 which extend over the straps 16 near the edges 22, and are secured to the top surface of the cover in a manner to permit slidable movement of the straps 16 therebelow. Although not essential to the invention, and not shown in the drawings, straps similar to the straps 16 can, if desired, be secured to the lower surfaces of the left and right panels 12, 13 in the same manner as straps 16, thus underlying the intermediate panel portion 14 so as to prevent sagging thereof when the cover 10 is used with an empty or only partially filled cargo bed. Moreover, the straps 16 need not be formed of resilient material, but, rather, they can be formed of non-stretchable cord or web-like material—such as a belt—which can be manually loosed or cinched up as required.

Securing of the cover 10 to the underlying cargo bed is accomplished by means of a cord 28 which extends around the outer perimeter of the cover defined by the main panels 12, 13. More particularly, the outer perimeter of the cover includes a number of pairs of eyelets 30 which are reinforced by rounded metallic members and which extend between the upper and lower surfaces of the cover. The cord 28 extends between adjacent eyelets 30 when the cord is above the upper surface of the cover 10, and between adjacent eyelet pairs when the cord is below the lower surface of the cover. In the unexpanded mode, the cord 28 extends somewhat loosely around the cover to permit its later expansion.

As shown in FIG. 2, the cover 10 is mounted to a vehicle having an open rear cargo bed formed by lengthwise extending sidewalls 32, a forward transverse sidewall 34, and a rear transverse tailgate 36. The cover 10 is secured across the upper edges of the sidewalls by means of a number of conventional bungee cords 38 having hooks at opposite ends of the cord. The hooks engage the cover perimeter cord 28, as well as a portion of the truck, such as the upper edge of the rear wheelwell, so as to extend vertically therebetween and to pull the cover tightly over the sidewall upper edges.

Figure 3:
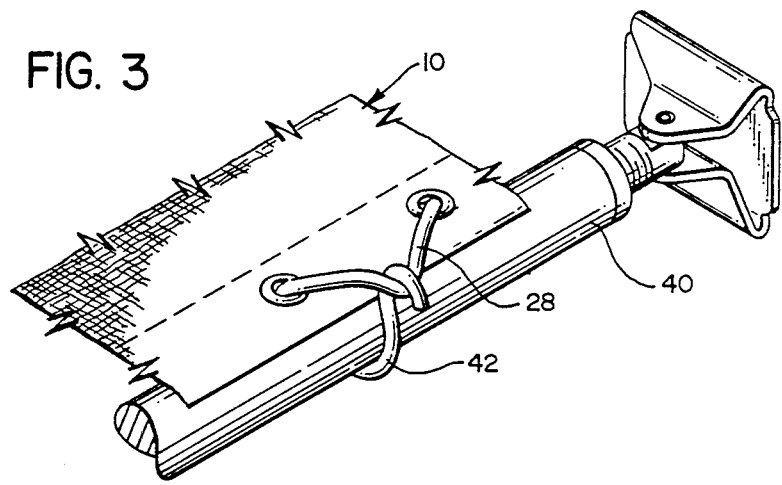
FIG. 3 is an isometric view showing an exemplary means of attaching the cover to the cargo bed.

In another exemplary embodiment shown in FIGS. 2 and 3, the cover 10 is secured to a bar 40 which extends in a transverse direction between the inner surfaces of the sidewalls 32 near the rear of the cargo bed. The adjustable bar 40 is described in more detail in a co-pending application, which is incorporated herein by reference, entitled "APPARATUS AND METHOD FOR SECURING CARGO", Ser. No. 923,878", filed Oct. 28, 1986. More particularly, there is mounted to the bar 40 an S-shaped hook 42 which extends around the bar 40 and which engages the cord 28. A similar bar 40 (not shown) may be mounted across the cargo bed near the forward wall 34 to secure the forward end of the cover.

Figure 4:
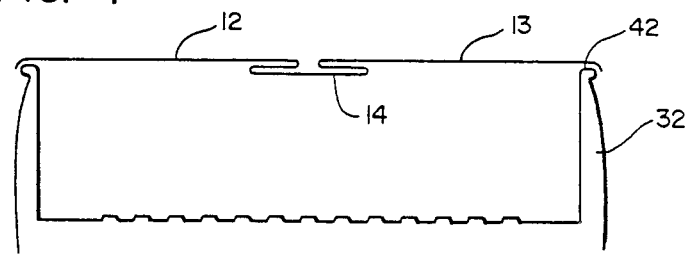
FIG. 4 is an end view of an empty cargo bed showing the attachment of the cover across the upper edges of the cargo bed sidewalls.

As discussed previously, when the rear cargo bed is empty or only partially full so that the cargo does not extend above the upper edges of the cargo bed sidewalls, then the cover 10 extends in a horizontal manner across the upper surface of the cargo bed as shown in FIGS. 2 and 4. However, when larger materials, such as the boxes 44 shown in FIG. 5, extend above the sidewall upper edges, the cover 10 is mounted to the truck rear cargo bed over the boxes and attached to the truck in the manner discussed previously. This is permitted by the intermediate portion 14 which provides sufficient additional material to enclose these upstanding materials 44. The resilient straps 16 permit the edges 22 of the left, right panels to separate apart, spreading the intermediate panel material.

Figure 6:
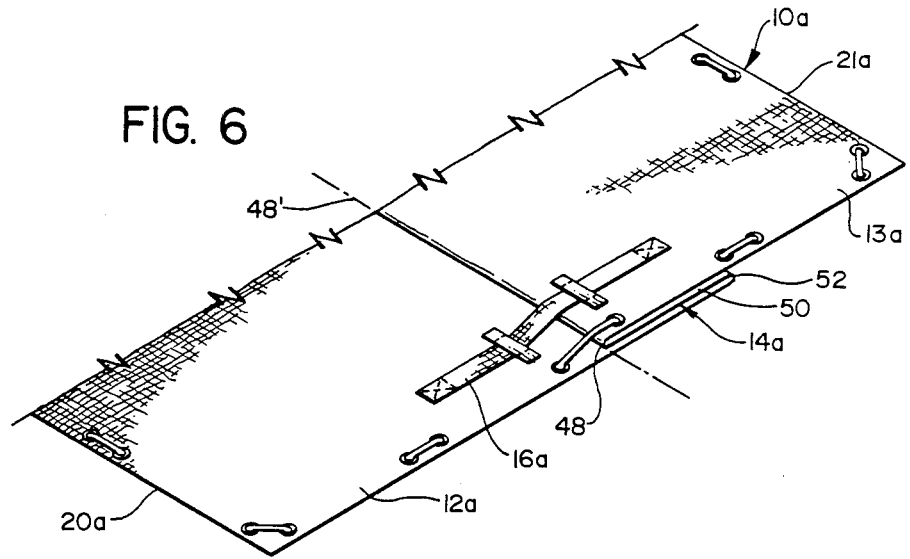
FIG. 6 is an isometric view of the cover showing an intermediate expandable portion of the cover which is folded in a different manner than that shown in FIG. 1.

In another exemplary embodiment shown in FIG. 6, like elements described in the previous embodiments are assigned like numerals with the suffix "a" attached. In this embodiment, the intermediate panel portion is formed by folding the right panel portion 13a along a lengthwise extending edge 48 so that an intermediate panel portion 50 extends outwardly in a horizontal manner toward right edge 21a. Then intermediate panel portion 50 reverses direction at a lengthwise fold 52 and extends toward the left edge 20a and joins with the left panel portion 12a at an imaginary edge designated by the line 48' which is co-linear with edge 48. In this manner, the intermediate portion is formed in a somewhat flattened Z-like configuration and is defined by the edges 48, 48'. In turn, the left main panel portion 12a includes the edges 20a, 48', and the right main panel portion 13a includes the edges 48, 21a. During expansion of the straps 16a, the edges 48, 48' separate apart, exposing the intermediate portion 14a. It should be appreciated that there are numerous configurations of the intermediate portion 14a to provide a surplus of material which can be utilized to provide an expandable cover. The advantages of the configurations of the intermediate portion 14a shown in FIGS. 1 and 6 is that they provide a neat, compact appearance.

In another exemplary embodiment shown in FIG. 7, like elements described in previous embodiments are assigned like numerals with the suffix "b" attached. In this embodiment, there is provided a first intermediate portion 14b which is parallel to the lengthwise axis 18b, as well as a second intermediate portion indicated at 60 which is parallel to a transverse axis 62 and which is intermediate a forward end 64 of the cover and a rear end 66. The transverse intermediate portion 60 is formed by folding the left, right panel portions 12b, 13b, along transverse edges 68 in a manner similar to that described previously with respect to the lengthwise edges 22b of intermediate portion 14b. The edges 68 are maintained in proximity to each other by means of straps 16b which extend in a manner parallel to the lengthwise axis 18b. In this manner, the cover 10b is expandable in both a lengthwise and transverse direction to accommodate materials which extend above the cargo bed sidewalls.

What is claimed is:

1. A cover assembly for covering cargo space surrounded by upstanding sidewalls and having an open top, said cover assembly comprising:
    a flexible cover panel having side panel portions at opposite sides and having an expandable, pleated central portion separating said side panel portions, said cover panel having a plurality of eyelets spaced apart around its periphery and including two pairs of eyelets in said side panel portions located adjacent the opposite ends of said central portion, the eyelets in each said pair being located at opposite sides of said central portion;
    elastic straps connected at their opposite ends to said side panel portions and extending over said central portion, said straps being arranged to yieldingly resist expansion of said central portion at multiple locations along the length thereof; and
    a tie-down cord threaded through said two pairs of eyelets and the remaining eyelets for restricting expansion of the ends of said central portion when said cord is tensioned between said two pairs of eyelets.

2. A cover assembly according to claim 1 in which said central portion has a pair of oppositely extended pleats located beneath respective of said side panel portions, and in which said elastic straps and tie-down cord between said two portions of said pairs of eyelets are located on the upper side of said side panel portions.

* * * * *